United States Patent [19]
Angleraud et al.

[11] 4,057,518
[45] Nov. 8, 1977

[54] PROCESS FOR THE MANUFACTURE OF HEAT RESISTANT MULTICELLULAR MATERIALS

[75] Inventors: René Angleraud, Feyzin; Pierre Ledru, Lyon, both of France

[73] Assignee: Rhone-Poulenc Industries, Paris, France

[21] Appl. No.: 569,316

[22] Filed: Apr. 17, 1975

[30] Foreign Application Priority Data

Apr. 19, 1974 France .................. 74.13693
Nov. 13, 1974 France .................. 74.37431

[51] Int. Cl.$^2$ .................. C08J 9/18; C08J 9/22
[52] U.S. Cl. .................. 260/2.5 N; 260/2.8 B; 260/2.55; 260/30.2; 260/32.6 N; 260/47 UA; 260/47 CZ; 260/47 CP; 260/830 P; 260/841; 260/857 PA; 260/858; 260/873
[58] Field of Search ............ 260/2.5 N, 78 UA, 2.5 B

[56] References Cited

U.S. PATENT DOCUMENTS

| | | | |
|---|---|---|---|
| B 317,080 | 1/1975 | Gerard | 260/78 UA |
| 3,249,561 | 5/1966 | Hendrix | 260/2.5 N |
| 3,310,506 | 3/1967 | Amborski et al. | 260/2.5 N |
| 3,483,144 | 12/1969 | Lavin | 260/2.5 N |
| 3,669,930 | 6/1972 | Ashara et al. | 260/78 UA |
| 3,705,118 | 12/1972 | Abolafia et al. | 260/2.5 N |
| 3,740,378 | 6/1973 | Criuello | 260/78 UA |
| 3,761,430 | 9/1973 | Witzel | 260/2.5 B |
| 3,878,172 | 4/1975 | Bargain et al. | 260/78 UA |
| 3,897,393 | 7/1975 | Lu | 260/78 UA |

OTHER PUBLICATIONS

Moiseyev et al., *Expanded Plastics*, pp. 3, 4, 20, 57–59, 70, 71, 101, 102 (MacMillan 1963).
Frisch et al., *Plastic Foams*, pp. 785, 803 (Dekker, 1973).

*Primary Examiner*—Morton Foelak
*Attorney, Agent, or Firm*—Stevens, Davis, Miller & Mosher

[57] ABSTRACT

Multicellular materials having excellent heat-resistance are provided by preparing granules of
1. a prepolymer obtained from:
   A. a product containing an imide group, which is
      a. a bis-imide of the formula:

$$D\diagdown\genfrac{}{}{0pt}{}{CO}{CO}\diagup N-A-N\diagdown\genfrac{}{}{0pt}{}{CO}{CO}\diagup D \quad (I)$$

in which D represents a radical of the formula:

$$CY=\atop CY= , \quad CH\diagdown\genfrac{}{}{0pt}{}{CH_2}{CH}\diagup\genfrac{}{}{0pt}{}{CH-}{CH-}\diagdown CH_2 \diagup , \text{ or } CH\diagdown\genfrac{}{}{0pt}{}{CH}{CH}\diagup\genfrac{}{}{0pt}{}{CH_2}{\diagdown CH}\diagup \genfrac{}{}{0pt}{}{CH-}{CH-}\diagdown_{(CH_3)_m}$$

wherein Y represents H, CH$_3$ or Cl, $m$ is 0 or 1, and A represents a divalent organic radical containing 2 to 30 carbon atoms, or
      b. a mixture comprising a bis-imide of formula (I) and a mono-imide of the formula:

$$D\diagdown\genfrac{}{}{0pt}{}{CO}{CO}\diagup N-R \quad (II)$$

in which D is as defined above and R represents a hydrogen atom or a monovalent organic radical containing 1 to 20 carbon atoms, and
   B. an amine product which is
      a. one or more polyamines containing from 2 to 5 primary or secondary amino groups, at least one of these groups being primary, or
      b. a mixture comprising one or more polyamines as defined under a) and one or more primary and/or secondary monoamines and/or one or more secondary polyamines,
2. a pore-forming agent and
3. a cell-forming agent, the degree of expansion (as hereinbefore defined) of which is a maximum of 90%, placing these granules in a mould, and effecting complete expansion and thermo-setting of the polymer by heating.

7 Claims, No Drawings

PROCESS FOR THE MANUFACTURE OF HEAT RESISTANT MULTICELLULAR MATERIALS

The present invention relates to a process for the manufacture of multicellular materials.

The use of synthetic multicellular materials in industry has advanced fairly considerably over the past few years due to the advantages of their very low density. These advantages are much appreciated in applications such as thermal insulation and the production of lightweight structural components, in particular in the aeronautical industry.

With regard to thermal insulation, there is an ever growing need for cellular materials which are capable of resisting severe heat exposure and, in this field, it has already been proposed to use polymers of the polyimide type which are formed from tetracarboxylic acids or their derivatives and diamines. It has been stated in French Pat. No. 1,555,564 that polyimide resins obtained by condensation of unsaturated bis-imides with a diprimary diamine can be converted into multicellular materials. It is possible to obtain such materials by heating a composition comprising a compound containing an imide group, an amine-type compound, a pore-forming agent and a cell-forming agent to a temperature such that the formation of the polymer and the expansion are effected simultaneously.

This technique, according to which the complete expansion of the polymer is effected in the mould intended to give the desired shape to the multicellular material, is particularly convenient for the production of articles which are thin or which have a simple shape. However, it is more difficult to carry out when it is desired to manufacture articles made of low density cellular material, which have a considerable volume or a complex shape; in particular it is difficult to achieve good distribution of the cellular structure in the mould.

It has now been found, according to this invention, that this difficulty can be overcome if a composition in which the resin, at the prepolymer stage, is already in the form of pre-expanded granules, is moulded and heated. Accordingly, the invention provides a process for the manufacture of cellular materials starting from a composition comprising:

1. A prepolymer obtained from:
   A. A compound containing an imide group, selected from
      a. a bis-imide of the formula:

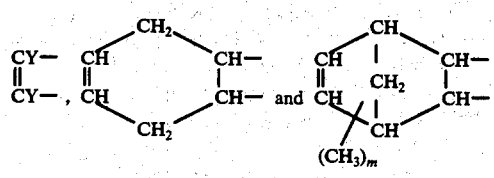

in which the symbol D represents a divalent radical selected from radicals of the formula:

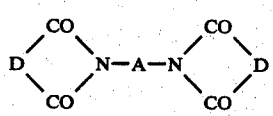

wherein Y represents H, $CH_3$ or Cl, $m$ is equal to 0 or 1, and the symbol A represents a divalent organic radical containing 2 to 30 carbon atoms, and
      b. a mixture comprising a bis-imide of formula (I) and a mono-imide of the formula:

in which the symbol D has the meaning indicated above and the symbol R represents a hydrogen atom or a monovalent organic radical containing 1 to 20 carbon atoms, and
   B. an amine-type compound selected from:
      a. One or more polyamines containing from 2 to 5 primary or secondary amino groups, at least one of these groups being primary, and
      b. a mixture comprising one or more polyamines such as are defined under a) and one or more primary and/or secondary monoamines and/or one or more secondary polyamines,
2. a pore-forming agent and
3. a cell-forming agent, which process consists in first preparing the prepolymer granules, the degree of expansion of which is a maximum of 90%, and then, after having placed these granules in a mould, effecting complete expansion and thermo-setting of the polymer by heating.

The degree of expansion of the pre-expanded material is the percentage of the volume of the pre-expanded material relative to the final volume which is obtained when the expansion is effected completely without counter-pressure (restraint).

The granules can have diverse shapes but are preferably rounded to facilitate their use. Advantageously, their largest dimension is from 0.5 to 20 mm. Numerous methods for obtaining the granules are suitable. For example, the material can be deposited in open moulds or on plates of suitable shape, casting drops of the molten material can be cast on a non-stick support or extruded ribbons chopped up.

The pre-expanded granules are obtained by heating a mixture of the prepolymer, generally as powder, pore-forming agent and cell-forming agent. The heating conditions are critical. In fact, the temperature and the duration of heating must be determined in such a way that the degree of expansion of the pre-expanded material is a maximum of 90%, preferably from 60 to 85%. The precise working conditions naturally depend on the nature of the constituents of the composition and on the amounts of pore-forming agent and cell-forming agent. As a general rule, the desired pre-expansion can be obtained by heating for 30 seconds to 5 minutes at a temperature not exceeding 200° C, generally from 90 to 180° C.

A pore-forming agent is a chemical substance which, on decomposing at a particular temperature, liberates gases such as nitrogen or carbon dioxide. Particularly suitable pore-forming agents advantageously have a decomposition temperature which is at least 20° C higher than the softening point of the prepolymer. Examples of such adjuvants are pore-forming agents such as azodicarbonamide or the products mentioned in "PLASTICS FORMS", Calvin J. BENNING volume 2, pages 294 to 320. The proportion of pore-forming agent, which varies depending on the desired density of the multicellular material, is generally from 0.1 to 10% of the weight of the prepolymer.

A cell-forming agent is an adjuvant, usually a surface-active agent, which promotes the distribution and the regularity of the cells in the polymer and enables the homogeneity of the multicellular composition to be increased. Examples of such adjuvants which enable the homogeneity of the cellular structure of the polymers to be increased are non-ionic surface-active agents, such as organopolysiloxanes containing organic blocks of the polyoxyalkylene type. Such copolymers are described, for example, in "PLASTICS FOAMS", Calvin J. BENNING, volume 2, pages 320 - 325. Cationic surface-active agents, such as N-alkyltrimethylenediamine dioleate the alkyl radical having 16 to 18 carbon atoms or the condensates of ethylene oxide with aminated coconut oil are also suitable. Anionic surface-active agents can also be used. The amount of cell-forming agent used depends on the nature and the amount of the pore-forming agent which is used. It is usually not more than 5% of the weight of the prepolymer.

Initially, a prepolymer is prepared which can be isolated and optionally purified and stored. At ambient temperature this prepolymer is generally in the form of a solid or non-cellular structure, which can be reduced to a powder or to the form of a viscous liquid.

The prepolymers can be prepared in bulk, the reaction being initiated by heating the mixture of reactants. The initiating temperature can vary within rather wide limits depending on the nature of the reactants which are present but, as a general rule, it is from 100° to 250° C and, more frequently, from 110° to 180° C. Depending on the physical state of the reactants which are present, conventional techniques for mixing finely divided solids can be used or one of the reactants can be dissolved or dispersed in the other kept in the liquid state.

Depending on the temperature, the nature and the proportions of the reactants which are present and depending on the degree to which the reaction is desired to proceed, the period of heating can vary within rather wide limits, but it is generally from 5 minutes to 3 hours.

The preparation of the prepolymers can also be effected by heating the reactants in an inert, polar, liquid diluent at the temperature selected (generally from 100° to 250°, preferably from 110° to 200° C). Suitable diluents include polar solvents such as dimethylformamide, N-methylpyrrolidone, dimethylacetamide, N-methylcaprolactam, diethylformamide, N-acetylpyrrolidone and cresols. The amount of diluent used is generally from 0.2 to 20 times the weight of imide which is introduced.

The compounds containing an imide group (A) and the amine-type compounds (B) are typically as follows.

In formula (I), symbol A can represent, for example, a linear alkylene radical having less than 13 carbon atoms, or a phenylene, cyclohexylene

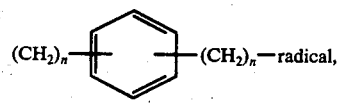

-continued

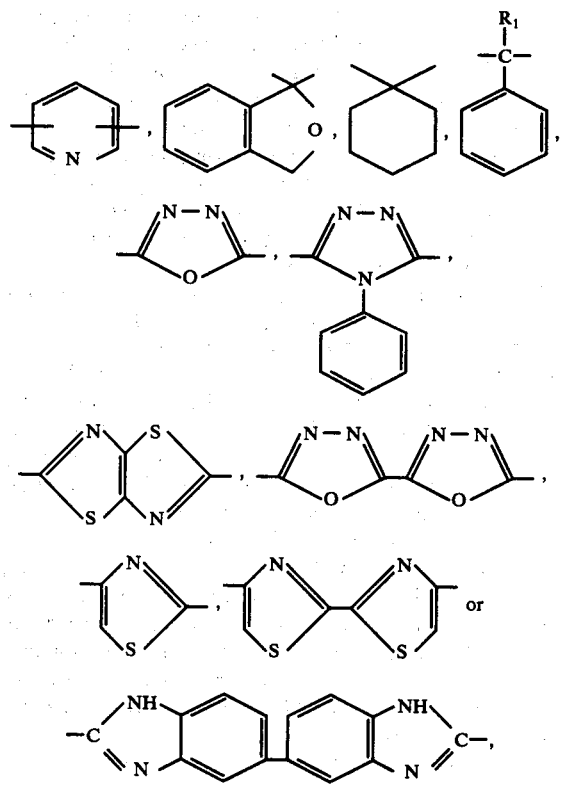

wherein n represents an integer from 1 to 3. Symbol A can also comprise several alkylene radicals which are linked to one another by an inert atom or group, such as —O—, —NR$_1$—, or several phenylene or cyclohexylene radicals which are linked to one another by a single valency bond or by an inert atom or group such as —O—, —S—, and alkylene group having from 1 to 3 carbon atoms, —CO—, —SO$_2$—, —NR$_1$—, —N=N—, —CONH—, —COO—, —P(O)R$_1$—, —CONH-X-NHCO—, wherein R$_1$ represents a hydrogen atom, an alkyl radical having from 1 to 4 carbon atoms, phenyl or cyclohexyl and X represents an alkylene radical having less than 13 carbon atoms. In addition, the various phenylene or cyclohexylene radicals can be substituted by groups such as CH$_3$ or OCH$_3$ or by a chlorine atom.

Specific examples of bis-imides which may be mentioned are: N,N'-ethylene-bis-maleimide, N,N'-hexamethylene-bis-maleimide, N,N'-meta-phenylene-bis-maleimide, N,N'-para-phenylene-bis-maleimide, N,N'-4,4'-biphenylene-bis-maleimide, N,N'-4,4'-diphenylmethane-bis-maleimide, N,N'-4,4'-diphenylmethane-bis-tetrahydrophthalimide, N,N'-4,4'-(diphenyl ether)-bis-maleimide, N,N'-4,4'-(diphenyl sulphide)-bis-maleimide, N,N'-4,4'-diphenylsulphone-bis-maleimide, N,N'-4,4'-dicyclohexylmethane-bis-maleimide, N,N'-α,α'-4,4'-dimethylene-cyclohexane-bis-maleimide, N,N'-meta-xylylene-bis-maleimide, N,N'-paraxylylene-bis-maleimide, N,N'-4,4'-(1,1-diphenylcyclohexane)-bis-maleimide, N,N'-4,4'-diphenylmethane-bis-citraconimide, N,N'-4,4'-(diphenyl ether)-bis-endomethylenetetrahydrophthalimide, N,N'-4,4'-diphenylmethane-bischloromaleimide, N,N'-4,4'-(1,1-diphenylpropane)-bis-maleimide, N,N'-4,4'-(1,1,1-triphenylethane)-bis-maleimide, N,N'-4,4'-triphenylmethane-bis-maleimide, N,N'-3,5-triazole-1,2,4-bis-maleimide, N,N'-dodecamethylene-bis-maleimide, N,N'-trimethyl-2,2,4-hexamethylene-bis-maleimide, 1,2-bis-(2-maleimido-ethoxy)-ethane, 1,3-bis-(3-maleimidopropoxy)-propane, N,N'-4,4'-benzophenone-bis-maleimide, N,N'-pyridine-2,6-diyl-bis-maleimide, N,N'-naphthylene-1,5-bis-maleimide, N,N'-cyclohexylene-1,4-bis-maleimide, N,N'-1,3-(5-methyl-phenylene)-bis-maleimide and N,N'-1,3-(5-methoxyphenylene)-bis-maleimide. These bis-imides can be prepared using the methods described in, for example, U.S. Pat. No. 3,018,290 and British Pat. Specification No. 1,137,592.

In formula (II), the symbol R can represent, for example, a linear or branched alkyl or alkenyl radical, which can contain up to 20 carbon atoms, a cycloalkyl radical containing 5 or 6 ring carbon atoms, a monocyclic or bicyclic aryl radical, an alkylaryl or aralky radical, which contains up to 20 carbon atoms, one of the radicals

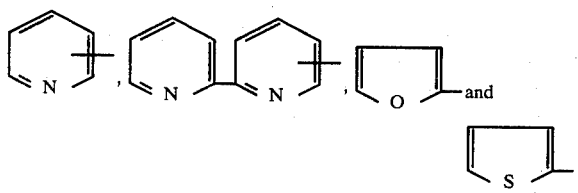

a monovalent radical composed of a phenyl radical and a phenylene radical which are linked to one another by a single valency bond or by an inert atom or group such as: —O—, —S—, an alkylene radical having from 1 to 3 carbon atoms, —CO—, —SO$_2$—, —NR$_1$—, —N=N—, —CONH—, —COO—, wherein R$_1$ has the above-mentioned meaning. In addition, these various radicals can be substituted by one or more atoms, radicals or groups, such as F, Cl, CH$_3$, OCH$_3$, OC$_2$H$_5$, OH,

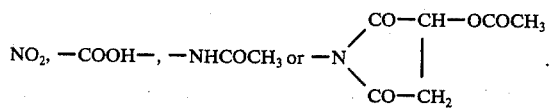

Specific examples of mono-imides of formula (II) which may be mentioned are maleimide, N-phenylmaleimide, N-phenyl-methylmaleimide, N-phenylchloromaleimide, N-p-chlorophenylmaleimide, N-p-methoxyphenylmaleimide, N-p-methylphenylmaleimide, N-p-nitrophenylmaleimide, N-p-phenoxyphenylmaleimide, N-p-phenylaminophenylmaleimide, N-p-phenoxycarbonylphenylmaleimide, N-p-phenylcarbonyl-phenylmaleimide, 1-maleimido-4-acetoxysuccinimido-benzene, 4-maleimido-4'-acetoxysuccinimido-diphenylmethane, 4-maleimido-4'-acetoxysuccinimido-diphenyl ether, 4-maleimido-4'-acetamido-diphenyl ether, 2-maleimido-6-acetamido-pyridine, 4-maleimido-4'-acetamido-diphenylmethane, N-methyl-maleimide, N-ethylmaleimide, N-vinyl-maleimide, N-allyl-maleimide, N-cyclohexyl-maleimide and N-decyl-maleimide. These mono-imides can be prepared using the methods described in, for example, U.S. Pat. Nos. 2,444,536 and 3,717,615 or in German Patent Application (DOS) 2,354,645.

When a mixture of a bis-imide of formula (I) together with a mono-imide of formula (II) is used, the number of imide groups contributed by the mono-imide suitably represents up to 30% of the total number of imide groups contributed by the mixture.

The amine-type compound (B) can be, in particular, a polyamine (1) of the formula:

$$H_2N - E - NH_2 \qquad (III)$$

in which the symbol E is as defined under symbol A in formula (I).

Examples of such compounds containing two primary amino groups, which may be mentioned, are bis-(4-aminocyclohexyl)-methane, 2,2-bis-(4-aminocyclohexyl)-propane, 1,4-diaminocyclohexane, 2,6-diaminopyridine, metaphenylenediamine, bis-(4-aminophenyl)-methane, 2,2-bis-(4-aminophenyl)-propane, benzidine, 4,4'-diaminophenyl ether, 4,4'-diaminophenyl sulphide, 4,4'-diaminodiphenylsulphone, bis-(4-aminophenyl)-methylphosphine oxide, bis-(4-aminophenyl)-phenylphosphine oxide, N,N'-bis-(4-aminophenyl)-methylamine, 1,5-diaminonaphthalene, meta-xylylenediamine, paraxylylenediamine, 1,1-bis-(para-aminophenyl)-phthalane, α,ω-polymethylenediamines, such as hexamethylenediamine, octamethylenediamine, decamethylenediamine and 2,5-dimethyl-heptamethylenediamine, the polyether diamines of the formula H$_2$N(CH$_2$)$_t$O(CH$_2$CH$_2$O)$_u$NH$_2$, in which t and u are integers from 1 to 10, such as, for example, the diamine of the formula H$_2$N(CH$_2$)$_3$O(CH$_2$)O(CH$_2$)$_3$NH$_2$, bis-(hexamethylenetriamine), diethylenetriamine, tetraethylenepentamine, 7,8-diamino-p-menthane, 6,6'-diamino-2,2'-dipyridyl, 4,4'-diamino-benzophenone, 4,4'-diaminoazobenzene, bis-(4-aminophenyl)-phenylmethane, 1,1-bis-(4-aminophenyl)-cyclohexane, 1,1-bis-(4-amino-3-methylphenyl)-cyclohexane, 2,5-bis-(m-aminophenyl)-1,3,4-oxadiazole, 2,5-(p-aminophenyl)-1,3,4-oxadiazole, 2,5-bis-(m-aminophenyl)-thiazole-(4,5-d)-thiazole, 5,5'-di-(m-aminophenyl)-2,2'-bis (1,3,4-oxadiazolyl), 4,4'-bis-(p-aminophenyl)-2,2'-dithiazole, m-bis-(4-p-aminophenyl-2-thiazolyl)-benzene, 2,2'-bis-(m-aminophenyl)-5,5'-di-benzimidazole, 4,4'-diaminobenzanilide, phenyl 4,4'-diamino-benzoate, N,N'-bis-(4-aminobenzoyl)-p-phenylenediamine, 3,5-bis-(m-aminophenyl)-4-phenyl-1,2,4-triazole, N,N'-bis-(p-aminobenzoyl)-4,4'-diaminodiphenylmethane, bis-p-(4-aminophenoxycarbonyl)-benzene, bis-p-(4-aminophenoxy)-benzene, 3,5-diamino-1,2,4-triazole, 1,1-bis-(4-aminophenyl)-1-phenyl-ethane and 3,5-bis-(4-aminophenyl)-pyridine.

The amine-type compound can also be a polyamine (2) containing 3 to 5 —NH$_2$ groups per molecule and containing up to 50 carbon atoms. In these polyamines (2), the —NH$_2$ groups can be carried by, for example, a benzene ring, which is optionally substituted by methyl groups, or by a naphthalene, pyridine or triazine ring; they can also be carried by several benzene rings which are linked together by a single valency bond or by an inert atom or group, which can be one of those described above under A, or also

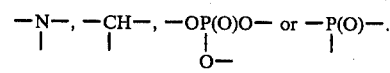

Examples of such polyamines which may be mentioned are 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,6-triaminopyridine, 2,4,4'-triamino-diphenyl, 2,4,4'-triamino-phenyl ether, 2,4,4'-triamino-diphenylmethane, 2,4,4'-triamino-diphenylsulphone, 2,4,4'-triamino-benzophenone, 2,4,4'-triamino-3-methyl-diphenylmethane, N,N,N-tris-(4-aminophenyl)-amine, tris-(4-aminophenyl)-methane, 4,4'4"-triamino-phenyl orthophosphate, tris-(4-amino-pheny)-phosphine oxide, 3,5,4'-triaminobenzanilide, melamine, 3,5,3',5'-tetraamino-benzophenone, 1,2,4,5-tetraamino-benzene, 2,3,6,7-tetraamino-naphthalene, 3,3'-diamino-benzidine, 3,3',4,4'-tetraamino-phenyl ether, 3,3',4,4'-tetraamino-diphenylmethane, 3,3',4,4'-tetraamino-diphenylsulphone, 3,5-bis-(3,4'-diaminophenyl)-pyridine, and the oligomers of the average formula:

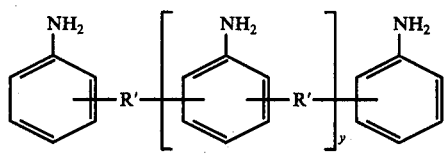

wherein y represents a number from about 0.1 to 2 and the symbol R' denotes a divalent hydrocarbon radical which has from 1 to 8 carbon atoms and is derived from an aldehyde or ketone or the general formula:

$$O = R'$$

in which the oxygen atom is linked to a carbon atom of the radical R'; typical aldehydes and ketones are formaldehyde, acetaldehyde, oenanthaldehyde, benzaldehyde, acetone, methyl ethyl ketone, hexan-2-one, cyclohexanone and acetophenone. These oligomers containing amino groups can be obtained according to the known processes, such as those described in French Pat. Nos. 1,430,977, 1,481,935 and 1,533,696; the crude mixtures of polyamines obtained according to these processes can be enriched in one or several constituents, for example by distillation under reduced pressure.

The amine-type compound can also be polyamine (3) containing up to 50 carbon atoms and containing a primary amine group and one or several secondary amine groups. Examples of such polyamines (3) which may be mentioned in particular are 4-methylamino-phenyl-4'-aminophenyl-methane, 4-methylamino-phenyl 4'-aminophenyl ether, 4-methylamino-phenyl-4'-aminophenylsulphone, 1-methylamino-4-aminobenzene, 2-methylamino-4-aminotoluene, 2-methylamino-5-aminoanisole, 3-methylaminopropylamine, N-4-aminobenzoyl-methylamine, 2-ethoxy-4-methylamino-aniline, 3'-methylamino-4-benzoylaminoaniline, 3-ethylaminoethoxy-propylamine, 3-(ethylaminoethyl-mercapto)-propylamine, 6-methylamino-hexylamine, 4-methylaminocyclohexyl-4'-aminocyclohexyl-methane, 2-phenylaminoethylamine, 2-(α-pyridylamino)-ethylamine, 2-(p-methylaminophenyl)-5-amino-1,3,4-oxadiazole, 2-(m-methylaminophenyl)-5-aminobenzoxazole, N-(p-aminobenzoyl)-piperazine, 3,5-bis-(methylamino)-4'-amino-benzanilide and 2,4-bis-(methylamino)-phenyl 4'-aminophenyl ether.

It should be understood that one or more amine-type compounds belonging to one or other of the sets of polyamines (1), (2) and (3) mentioned above can be used or a mixture of compounds belonging to two or three of these sets can be used.

A mixture consisting of one or more polyamines (1), (2) and/or (3), and one or more other amine-type compounds, which contain only one primary or secondary amino group or contain several amino groups of which none is primary, can also be used.

By way of illustration of primary or secondary monoamines there may be mentioned in particular methylamine, ethylamine, butylamine, octylamine, cyclohexylamine, cyclohexylmethylamine, aniline, o-chloroaniline, p-anisidine, α-naphthylamine, benzylamine, 2-phenylethylamine, 2-aminopyridine, 3-aminofurane, 2-aminopyrimidine, 5-aminobenzoxazole, 5-amino-benzothiazole, ethanolamine, hexylamine, nonylamine, laurylamine, stearylamine, 3-butoxypropylamine, 3-diethylamino-propylamine, o-toluidine, o-anisidine, o-aminophenol, phenyl p-aminophenyl ether, m-aminobenzophenone, m-aminobenzanilide, p-diphenylaminoaniline, dibutylamine, diethanolamine, methylethylamine, monoethylaniline, piperidine, morpholine, monomethylaminocyclohexane, monomethylaminonaphthalene and the diphenyl- and N-α- or N-β-naphthyl-anilines and phenyl-4-aminophenyl-sulphone.

When the amine-type compound consists of a secondary monoamine or polyamine, the proportion of this in the mixture is preferably such that the number of amino groups contributed by the said amine represents a maximum of 30% of the total number of amino groups in the amine-type compound (B).

By way of illustration of secondary polyamines, which can also contain tertiary amine groups, there may be mentioned bis-(4-methylamino-phenyl)-methane, bis-(4-methylamino-phenyl) ether, 2,2-bis-(4-methylamino-phenyl)-propane, bis-(3-methylamino-phenyl)-sulphone, 1,3-bis-(methylamino)-benzene, 1,4-bis-(phenylamino)-benzene, 1,4-bis-(β-naphthylamino)-benzene, bis-(4-methylamino-cyclohexyl)-methane, N,N'-diethylhexamethylenediamine, 2,5-bis-(methylamino)-1,3,4-oxadiazole, piperazine, 1,2-bis-(3-methylamino-propoxy)-ethane, N-(4-methylamino-phenyl)-piperazine, tris-(4-methylamino-phenyl)-amine, tris-(4-ethylamino-phenyl)-phosphine, 3,5,4'-tris-(methylamino)-benzanilide and 3,3',5,5'-tetrakis-(methylamino)-benzophenone.

Advantageously, the quantities of the compound containing an imide group (A) and the amine-type compound (B) used are such that the ratio <u>number of double bonds in compound A</u>
number of —NH$_2$ groups in compound B is from 0.8 to 10, preferably from 1 to 5.

Liquid, or solid adjuvants in the form of powder, spheres, lamellae, granules, fibres or flakes, can also be added to the prepolymer, in order to improve or modify one or more characteristics of the finished article. More precisely, the adjuvants can consist of fibres of glass, carbon, asbestos or synthetic polymers, in particular polyamide-imides or aromatic polyamides, or of pulverulent particles such as pyrogenic silicas, ground crude silicas, quartz, alumina, titanium dioxide, talc, kaolin, mica, calcium carbonate, graphite and carbon black. Such adjuvants usually represent from 5 to 50% by weight of the prepolymer.

Adjuvants which enable the hardness, the mechanical properties or the heat stability of the multicellular materials to be increased can also be mixed into the prepolymer. Amongst these adjuvants, boron oxide may be mentioned in particular; this is generally used in an amount of from 1 to 30% of the weight of the prepolymer and it increases the resistance to heat and flame.

It is also possible to modify the properties of the multicellular material by incorporating resins or elastomers such as phenolic resins, epoxy resins, unsaturated polyesters, polyamide-imides, polyurethanes, polysulphones or allyl polymers. Epoxy resins such as those described in French Pat. No. 2,045,087, polysulphones such as those described in French Pat. No. 2,101,796, polyesters such as those described in French Pat. No. 2,101,878, allyl polymers such as those described in French Pat. No. 2,094,607 or polyamideimides such as those described in French Pat. No. 1,473,600 can be used. Quantities of resins or elastomer amounting to up to 100% relative to the weight of the prepolymer can generally be incorporated.

The conversion of the pre-expanded granules into multicellular materials can be effected by heating, suitably at a temperature from 90° C to 250° C, more generally from 150° to 230° C, for 5 minutes to 5 hours.

The multicellular material can be subsequently heat-treated for, for example, 2 hours to 24 hours at a temperature from 180° to 300° C. Its mechanical properties and, in particular, its compressive strength can be improved in this way.

The multicellular materials according to the present invention usually have an apparent density from 0.03 to 0.8 and a regular cellular structure, generally 80 to 96% of the cells being closed. They are very largely inert to solvents and chemical agents, have an excellent resistance to heat exposure and to flame and are self-extinguishing. The mechanical properties are usually satisfactory up to a density of the order of 0.1. In order to obtain an essentially closed cell material, the prepolymers should not contain solvents which are volatile under the temperature conditions required for the expansion.

As a consequence of these properties, the multicellular materials according to the invention are of value in numerous fields in industry. They can be used, in particular, for the production of laminated or nonlaminated sheets, which are intended for thermal insulation or sound insulation of chambers at a high temperature, particularly in the building industry, the aeronautical industry and the space industry.

The use of pre-expanded granules according to the present invention provides numerous advantages. In fact, granules are more simple to handle than a powder. Moreover, in the case of moulding large objects or complex shapes the distribution of the multicellular material is much more homogeneous with granules which take up almost the whole volume than with a powder which settles in the base of the mould and must, by an increase in volume which can be as much as 15 or 20 times the initial volume distribute itself throughout the volume of the article to be produced.

It has been found that, after complete expansion, the granules disappear completely to give a homogeneous composition with a uniform cellular structure. The mechanical properties of the multicellular material are essentially the same whatever the method of preparation may be, whether this starts from non-expanded powder or via the intermediate stage of pre-expanded granules.

The prepolymers and also the pore-forming agents and cell-forming agents described above are all suitable. However, particularly interesting results have been obtained starting from a composition comprising, as the prepolymer, the product of the reaction of N,N'-4,4'-diphenylmethane-bis-maleimide and 4,4'-diaminodiphenylmethane, 4,4'-diphenyloxy-disulphohydrazide and N-alkyltrimethylene-diamine dioleate the alkyl radical having 16 to 18 carbon atoms.

The following Example further illustrates the present invention.

EXAMPLE 100 g of a prepolymer having a softening point, measured on the Kofler block, of 105° C and obtained from N,N'-4,4'-diphenylmethane-bis-maleimide and diaminodiphenylmethane in a ratio (K):

$$\frac{\text{number of double bonds in the bis-maleimide}}{\text{number of } -NH_2 \text{ groups in the amine-type compound}} = 2.5$$

are placed in a mortar.

4 g of 4,4'-diphenyloxy-disulphohydrazide and 1 g of a 50% strength solution of N-alkyltrimethylenediamine dioleate the alkyl radical having 16 to 18 carbon atoms in methanol are added.

After grinding and homogenising, the holes of a grid placed on a sheet of Teflon-coated fabric are filled manually. The grid characteristics are as follows: diameter of the holes 5 mm, spacing of the holes 3 mm, thickness of the grid 3 mm. The grid is then withdrawn vertically with care. Small discs of powder remain on the sheet. The sheet is then placed in a ventilated oven at 175° C. It is left for 2 minutes. The discs of powder melt and then start to expand. They are left to cool and then the granules, which are more or less spherical and have a diameter of about 5 mm, are detached from the sheet.

A parallelepiped mould is about 4/5 filled with these granules and the mould is closed. It is placed in a ventilated oven at 175° C for 15 minutes. A parallelepiped, multicellular, yellow composition, having a density of 0.13, is obtained. On removal from the mould it is found that the granules have disappeared and that the foam obtained is homogeneous and regular.

Heat-treatment is carried out for 24 hours at 200° C in a ventilated oven. The colour changes from yellow to brown, but no loss in weight is found.

The compressive strength at 10% deformation (Standard Specifications ISO TC 45 and 61) is 12 kg/cm² after heat-treatment.

The material obtained is non-inflammable according to Standard Specification ASTM D 1692 59 T.

We claim:
1. Process for the manufacture of a multicellular material which comprises preparing pre-expanded granules of:
　1. a prepolymer which is a product of reaction of N,N'-4,4'-diphenylmethane-bis-maleimide and 4,4'-diaminodiphenylmethane, the ratio

$$\frac{\text{number of double bonds in the bis-maleimide}}{\text{number of } -NH_2 \text{ groups in the diamine}}$$

being from about 1 to about 5;
　2. a flowing agent; and 3. a cell-control agent;
the degree of expansion of which is a maximum of 90%, placing these granules in a mould and effecting complete expansion and thermo-setting of the polymer by heating.

2. Process according to claim 1 in which the flowing agent has a decomposition temperature which is at least 20° C higher than the softening point of the prepolymer.

3. Process according to claim 1 in which the flowing agent is present in an amount from 0.1 to 10% by weight of the prepolymer.

4. Process according to claim 1, in which the cell-control agent is a cationic, non-ionic or anionic surface-active agent.

5. Process according to claim 1 in which the cell-control agent is present in an amount up to 5% by weight of the prepolymer.

6. Process according to claim 1 in which the granules have a degree of expansion of 60 to 85%.

7. Process according to claim 1 in which the heating is carried out at 150° to 230° C for 5 minutes to 5 hours.

* * * * *